(12) United States Patent
Lin (10) Patent No.: US 8,500,581 B2
(45) Date of Patent: Aug. 6, 2013

(54) MULTIPLE SPROCKET ASSEMBLY FOR BICYCLE

(76) Inventor: Chang Hui Lin, Changhua Hsien (TW)

( * ) Notice: Subject to any disclaimer, the term of this patent is extended or adjusted under 35 U.S.C. 154(b) by 267 days.

(21) Appl. No.: 12/928,050

(22) Filed: Dec. 2, 2010

(65) Prior Publication Data

US 2012/0142466 A1    Jun. 7, 2012

(51) Int. Cl.
*B62M 9/124*    (2010.01)
(52) U.S. Cl.
USPC ............................................................ 474/80
(58) Field of Classification Search
CPC ................................ B62M 9/124; B62M 9/12
USPC ............................................. 474/80, 82, 78
See application file for complete search history.

(56) References Cited

U.S. PATENT DOCUMENTS

| | | | |
|---|---|---|---|
| 4,773,893 A | 9/1988 | Su et al. | |
| 4,801,287 A * | 1/1989 | Romano | 474/82 |
| 4,813,916 A | 3/1989 | Valin | |
| 4,889,521 A | 12/1989 | Nagano | |
| 5,078,653 A | 1/1992 | Nagano | |
| 5,188,569 A | 2/1993 | Kobayashi | |
| 5,192,248 A | 3/1993 | Nagano | |
| 5,192,249 A | 3/1993 | Nagano | |
| 5,350,339 A | 9/1994 | Carmichael | |
| 5,354,243 A | 10/1994 | Kriek | |
| 5,466,194 A | 11/1995 | Steinberg et al. | |
| 5,738,603 A | 4/1998 | Schmidt et al. | |
| 6,102,821 A | 8/2000 | Nakamura | |
| 7,166,048 B2 * | 1/2007 | Shahana et al. | 474/82 |
| 2003/0220163 A1 * | 11/2003 | Yin | 474/80 |
| 2009/0054183 A1 * | 2/2009 | Takachi et al. | 474/80 |

* cited by examiner

*Primary Examiner* — Michael Mansen
*Assistant Examiner* — Diem Tran
(74) *Attorney, Agent, or Firm* — Charles E. Baxley (57) ABSTRACT

A multiple sprocket assembly includes a number of sprockets attached to a hub of a bicycle frame, and a rear chain transfer device having a carrier slidably attached to the bicycle frame and movable relative to an image plane formed by addendum of the teeth of the sprockets for engaging with a chain and for carrying and moving the chain onto the teeth of the sprockets, the rear chain transfer device includes a support attached to the bicycle frame, and a sliding member slidably attached to the support, and the carrier is attached to the sliding member for engaging with the chain and for carrying and moving the chain onto the teeth of the sprockets, an actuating device moves the sliding member relative to the support.

7 Claims, 15 Drawing Sheets

MULTIPLE SPROCKET ASSEMBLY FOR BICYCLE

BACKGROUND OF THE INVENTION

1. Field of the Invention

The present invention relates to a multiple sprocket assembly for a bicycle, and more particularly to a multiple sprocket assembly including an improved carrying or moving device for smoothly carrying or moving the chain over or onto the sprockets of the multiple sprocket assembly and for preventing the chain from being scraped or scrubbed with the sprockets.

2. Description of the Prior Art

Typical multiple sprocket assemblies comprise a hub attached or mounted or secured to a bicycle frame with a quick release mechanism, a number of sprockets attached or mounted or secured onto the hub with bearing members or a one-way clutch mechanism for engaging with the chain, and a front chain transfer device and a rear chain transfer device attached or mounted or secured onto the bicycle frame for carrying or moving the chain over or onto the sprockets of the multiple sprocket assembly.

For example, U.S. Pat. No. 4,773,893 to Su et al., U.S. Pat. No. 4,813,916 to Valin, U.S. Pat. No. 4,889,521 to Nagano, U.S. Pat. No. 5,078,653 to Nagano, U.S. Pat. No. 5,188,569 to Kobayashi, U.S. Pat. No. 5,192,248 to Nagano, U.S. Pat. No. 5,192,249 to Nagano, U.S. Pat. No. 5,350,339 to Carmichael, U.S. Pat. No. 5,354,243 to Kriek, U.S. Pat. No. 5,466,194 to Steinberg et al., U.S. Pat. No. 5,738,603 to Schmidt et al., and U.S. Pat. No. 6,102,821 to Nakamura disclose several of the typical multiple sprocket assemblies each also comprising a number of sprockets attached or mounted or secured onto the hub with bearing members or a one-way clutch mechanism for engaging with the chain, and a front chain transfer device and a rear chain transfer device attached or mounted or secured onto the bicycle frame for carrying or moving the chain over or onto the sprockets of the multiple sprocket assembly.

However, normally, while shifting the gear or changing the speed, the chain should be contacted and scraped or scrubbed with the sprockets for moving between the sprockets of different outer diameter, but the chain may not be moved to directly engage with the teeth of the sprockets without scraping or scrubbing with the sprockets.

The present invention has arisen to mitigate and/or obviate the afore-described disadvantages of the conventional multiple sprocket assemblies.

SUMMARY OF THE INVENTION

The primary objective of the present invention is to provide a multiple sprocket assembly including an improved carrying or moving device for smoothly carrying or moving the chain over or onto the sprockets of the multiple sprocket assembly and for preventing the chain from being scraped or scrubbed with the sprockets.

In accordance with one aspect of the invention, there is provided a multiple sprocket assembly comprising a number of sprockets attached to a hub of a bicycle frame, the sprockets each including a number of teeth, and the sprockets including an image plane formed by addendum of the teeth of the sprockets, and a rear chain transfer device including a carrier slidably attached to the bicycle frame and movable relative to the image plane formed by addendum of the teeth of the sprockets for engaging with a chain and for carrying and moving the chain onto the teeth of the sprockets.

The rear chain transfer device includes a support attached to the bicycle frame, and a sliding member slidably attached to the support, and the carrier is attached to the sliding member. The support includes a chamber formed therein for slidably receiving and engaging with the sliding member.

The sliding member includes at least one bearing member engaged with the support and the sliding member for allowing the sliding member to be guided to smoothly move relative to the support.

The sliding member includes a compartment formed therein, the rear chain transfer device includes an actuating device having a shaft rotatably attached to the support and engaged into the compartment of the sliding member, and the shaft includes a helical groove formed in an outer peripheral portion of the shaft for engaging with the bearing member and for actuating the shaft to rotate relative to the sliding member and for moving the sliding member into and out of the support when the shaft is rotated relative to the support.

The shaft includes a pulley for engaging with a cable. The shaft includes a cavity formed therein for receiving a spring biasing member which is secured between the shaft and the sliding member. The spring biasing member includes a first end secured to the shaft and a second end secured to the sliding member.

The support includes a cover attached to one end thereof, the shaft is rotatably attached to the cover of the support and extended into the support. The support includes at least one fastener attached to the cover for engaging with the shaft and for limiting the shaft to rotate relative to the support.

A cable may further be provided and coupled to the sliding member for selectively moving the sliding member relative to the support. The carrier includes at least one frame plate, and a pair of jockey wheels attached to the frame plate for engaging with the chain and for carrying and moving the chain onto the teeth of the sprockets.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 14:
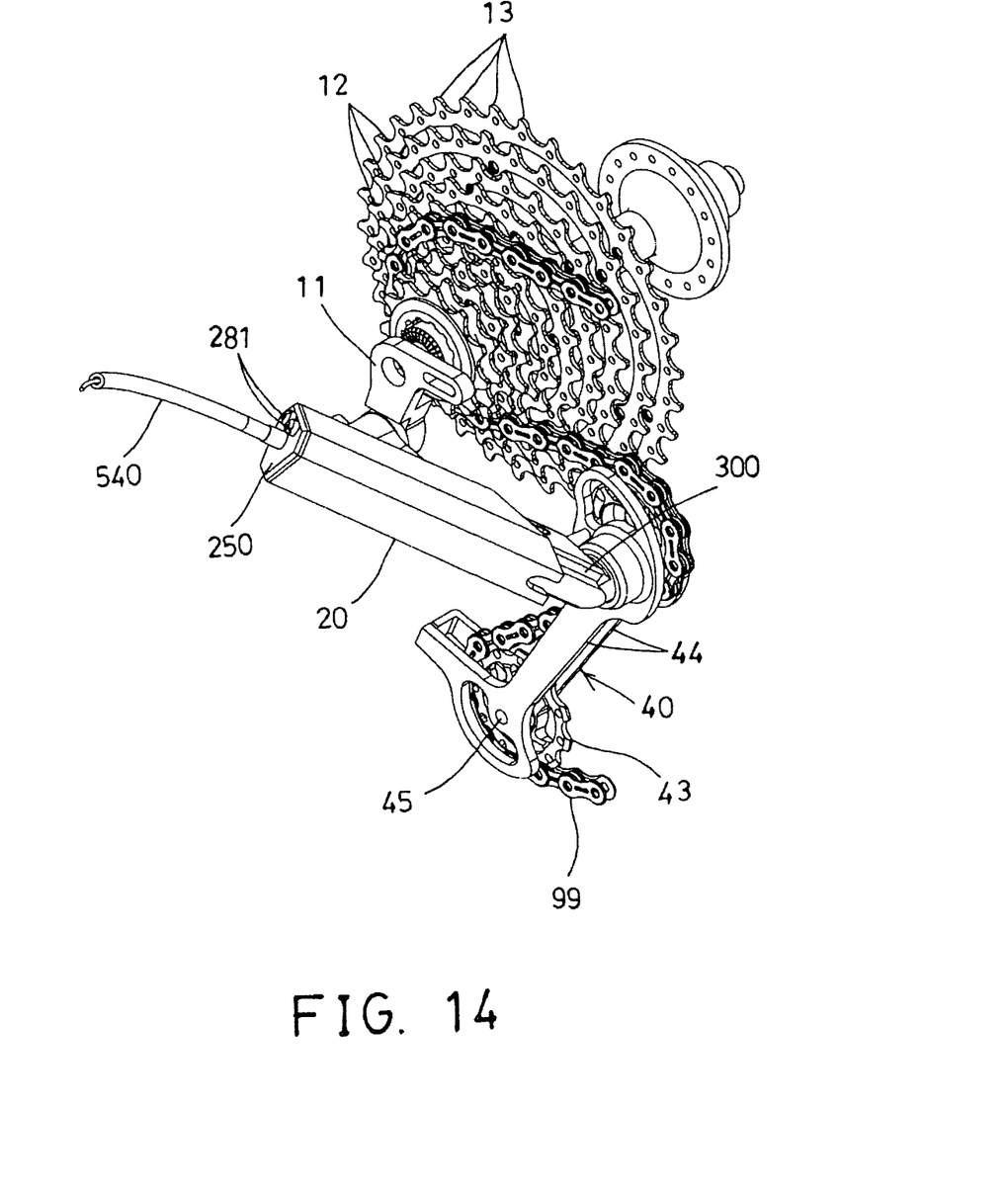
FIG. 14 is a further partial perspective view illustrating the operation of the multiple sprocket assembly as shown in FIGS. 11-13.
Figure 15:
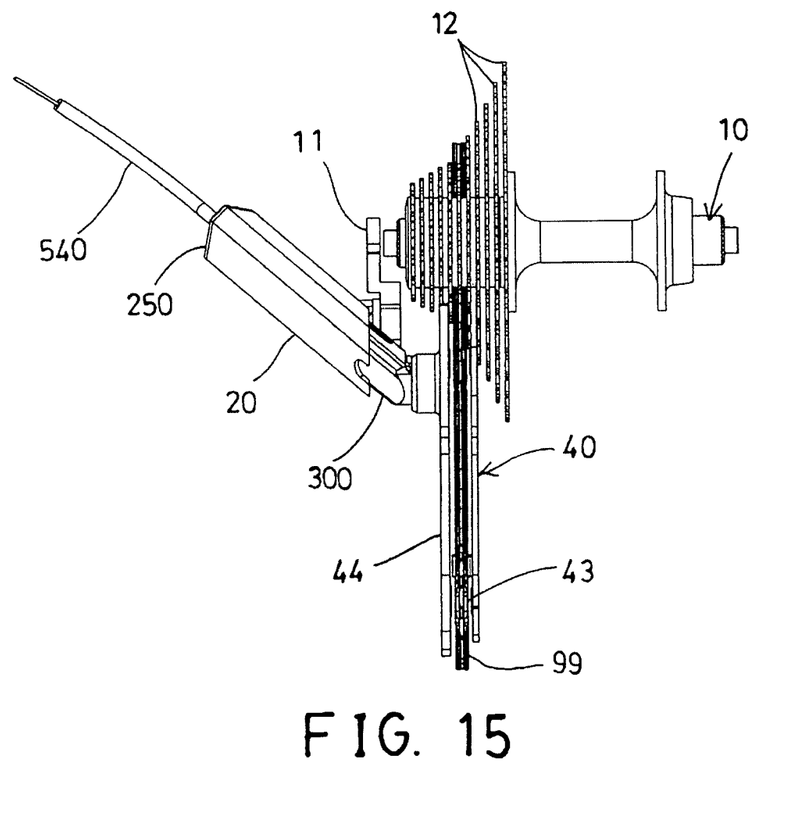
FIG. 15 is a further partial top plan schematic view illustrating the operation of the multiple sprocket assembly as shown in FIGS. 11-14.

Referring to the drawings, and initially to FIGS. 1-4, a multiple sprocket assembly in accordance with the present invention comprises a hub 10 attached or mounted or secured to a bicycle frame 11 with a quick release mechanism (not shown) or the like, a number of sprockets 12 attached or mounted or secured onto the hub 10 with bearing members or a one-way clutch mechanism (not shown) for engaging with a chain 99 (FIGS. 14, 15), and a front chain transfer device (not shown) and a rear chain transfer device 2 attached or mounted or secured onto the bicycle frame 11 for carrying or moving the chain 99 over or onto the number of teeth 13 of each of the sprockets 12. The hub 10 and the sprockets 12 and the front chain transfer device are typical and are not related to the present invention and will not be described in further details.

Figure 1:
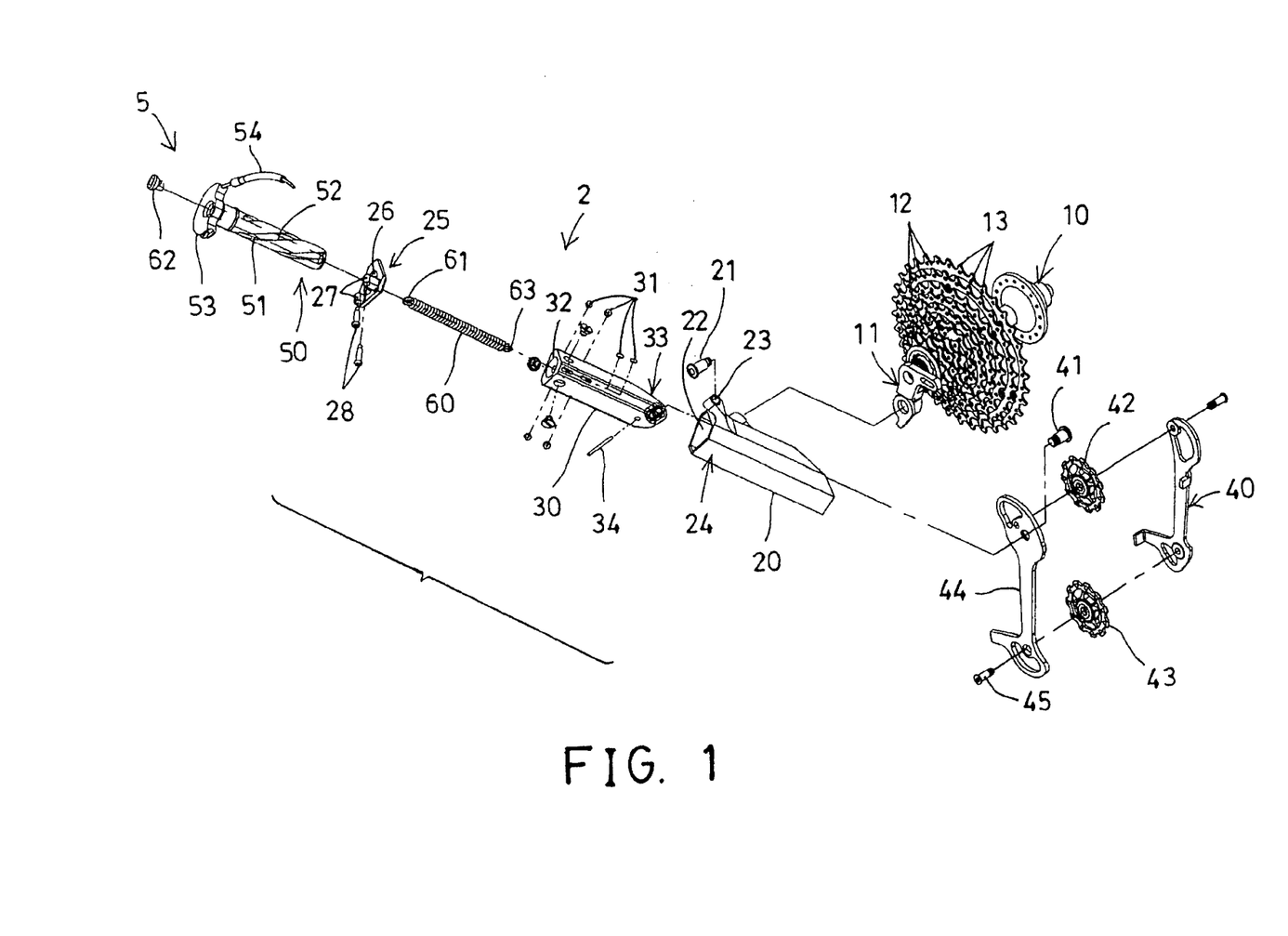
FIG. 1 is a partial exploded view of a multiple sprocket assembly in accordance with the present invention.
Figure 2:
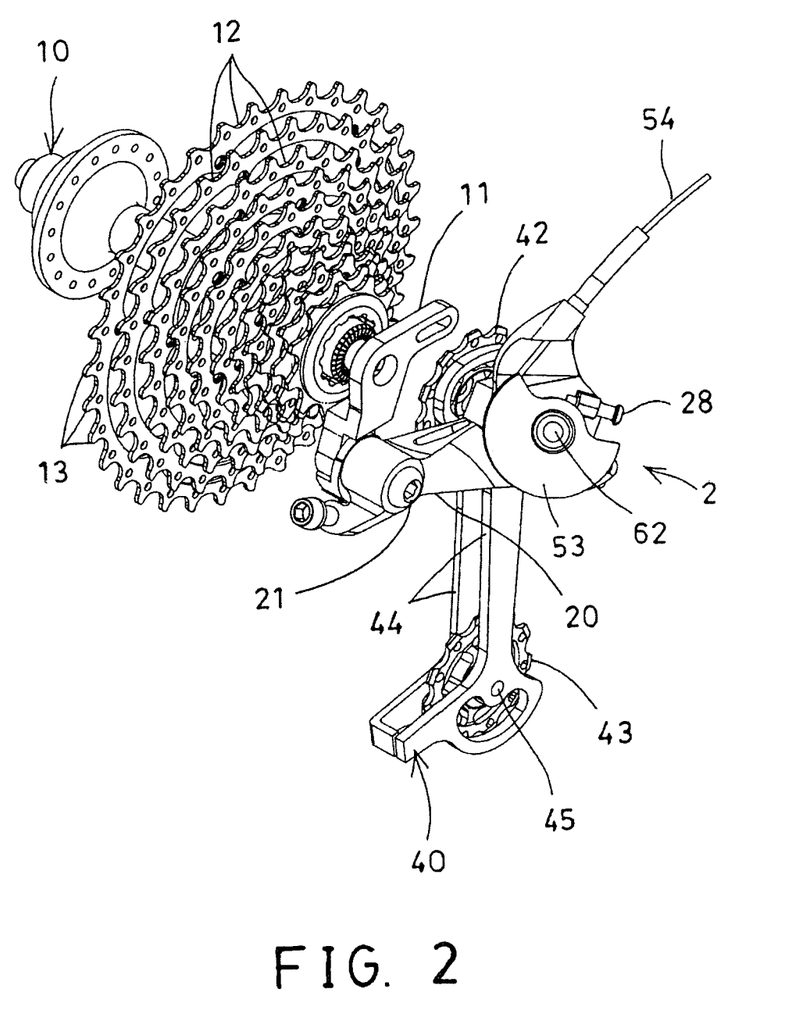
FIG. 2 is a partial rear perspective view of the multiple sprocket assembly.
Figure 3:
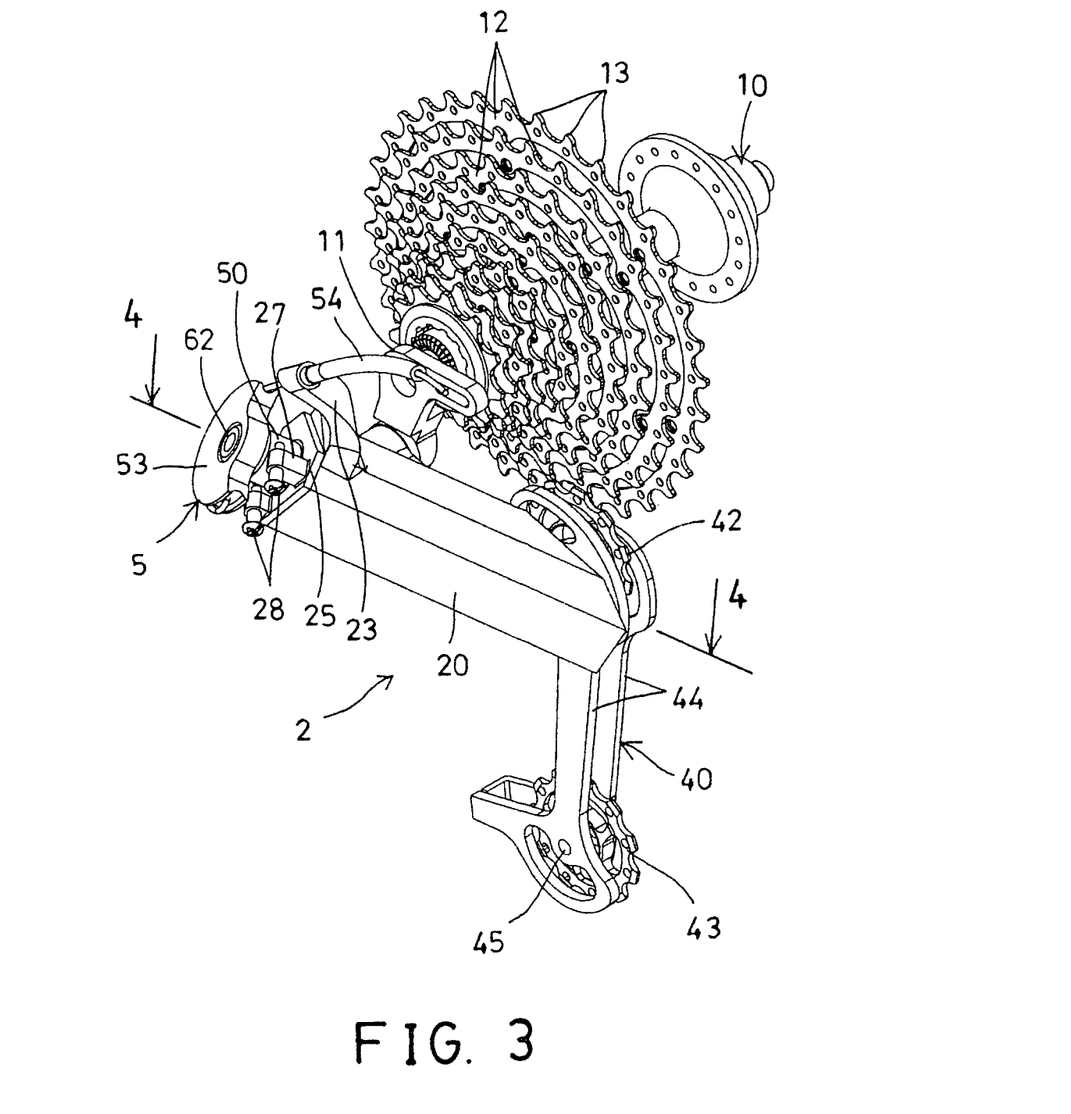
FIG. 3 is another partial perspective view of the multiple sprocket assembly as seen from the opposite direction to that shown in FIG. 2.

The rear chain transfer device 2 includes a rail or housing or support 20 attached or mounted or secured to the bicycle frame 11 with one or more latches or fasteners 21, and includes a chamber 22 formed in the housing or support 20, and includes one or more extensions 23 extended outwardly from the housing or support 20, and includes a cap or cover 25 attached or mounted or secured to one end 24 of the support 20, or formed integral with the support 20, and having a bore 26 formed in the cover 25, and having one or more (such as two) ears 27 extended outwardly from the cover 25 and each for engaging with a threaded or screw member or fastener 28, the cover 25 may partially block or seal the one end 24 of the support 20 or for closing the one end 24 of the chamber 22 of the support 20.

A sliding member 30 is slidably received or engaged in the chamber 22 of the support 20, and includes one or more bearing members 31 attached or mounted or secured to the sliding member 30 or engaged with or between the support 20 and the sliding member 30 for allowing the sliding member 30 to be smoothly moved relative to the support 20 and to be selectively moved or extended into or out of the support 20, and the sliding member 30 includes a bore or compartment 32 formed therein, and includes one end 33 attached or mounted or secured to a cage assembly or chain carrier 40 with one or more latches or fasteners 41 for slidably attaching the carrier 40 to the bicycle frame 11, the bearing members 31 are partially extended out of the sliding member 30 for engaging with the support 20, and may also be partially extended into the compartment 32 of the sliding member 30.

Figure 4:
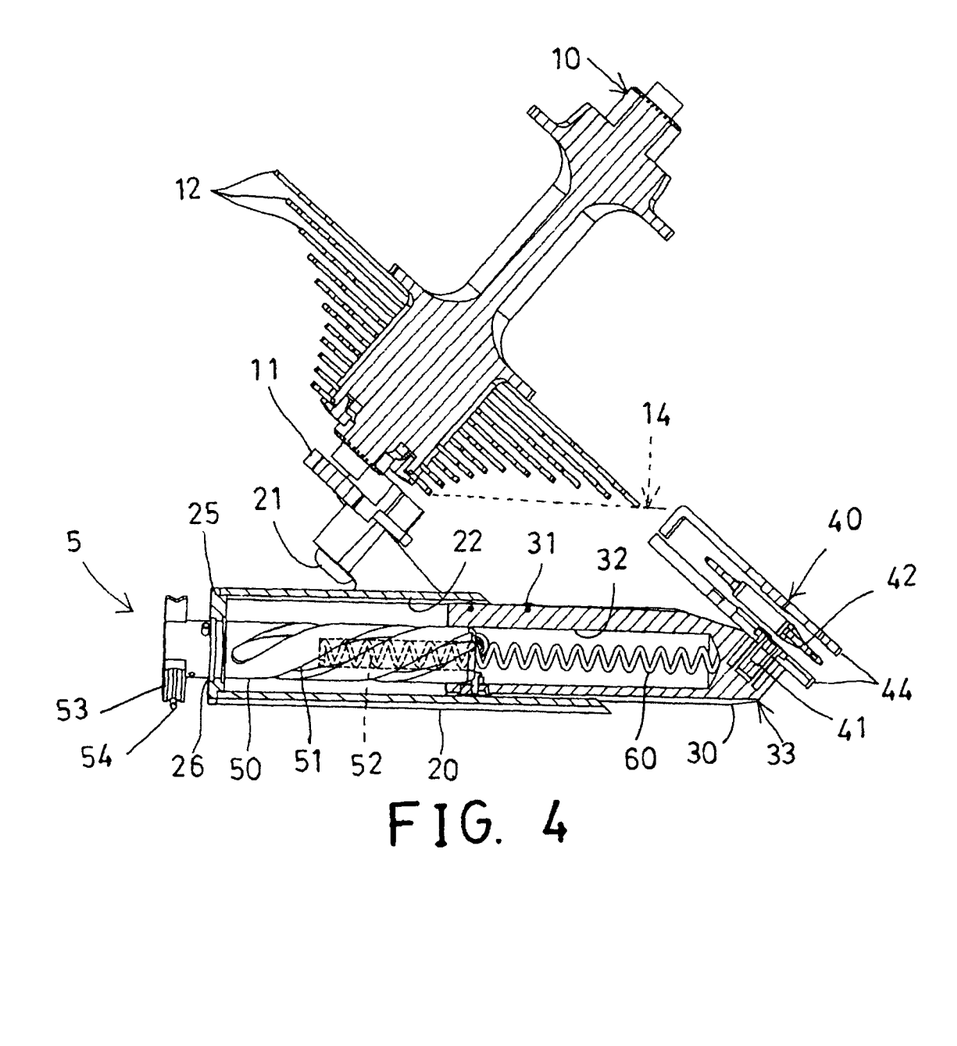
FIG. 4 is a partial cross sectional view of the multiple sprocket assembly taken along lines 4-4 of FIG. 3.
Figure 5:
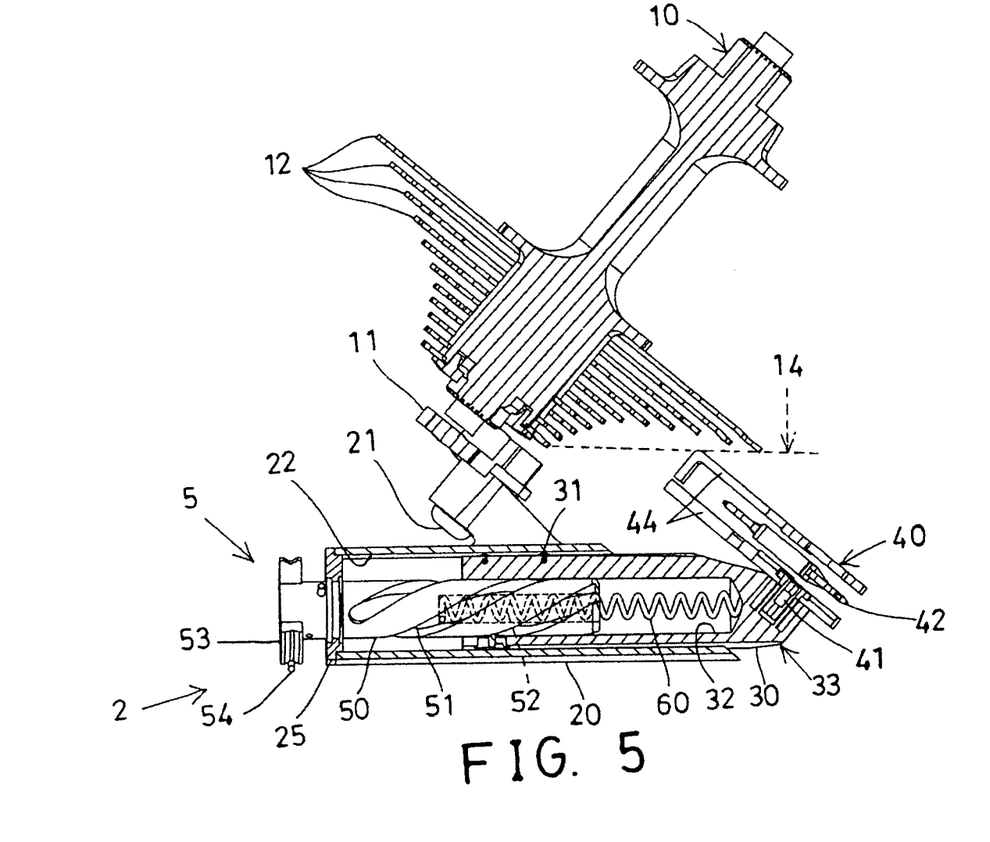
FIG. 5 is another partial cross sectional view similar to FIG. 4, illustrating the operation of the multiple sprocket assembly.
Figure 6:
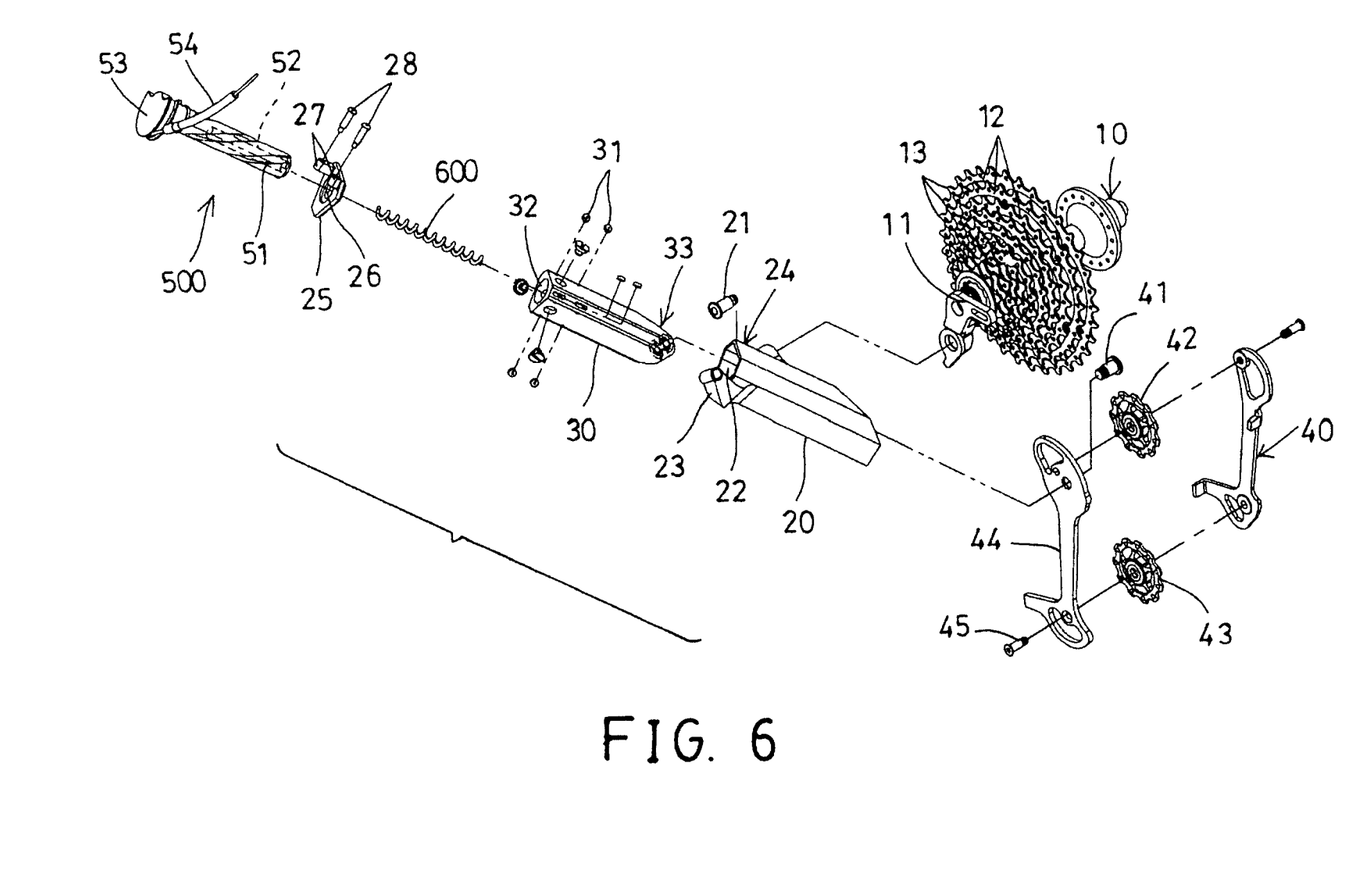
FIG. 6 is another partial exploded view similar to FIG. 1, illustrating the other arrangement of the multiple sprocket assembly.
Figure 7:
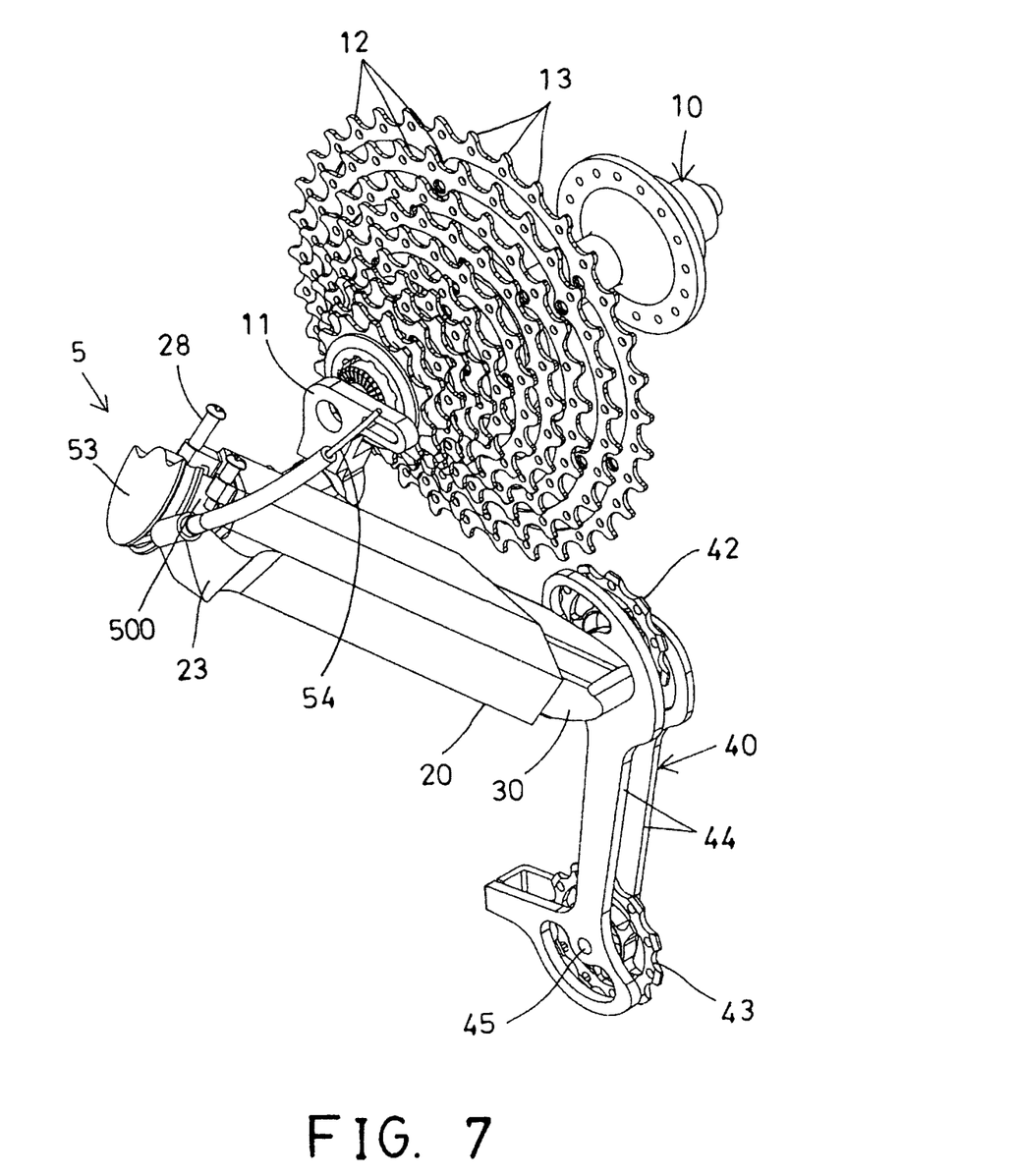
FIG. 7 is a partial perspective view of the multiple sprocket assembly as shown in FIG. 6.
Figure 8:
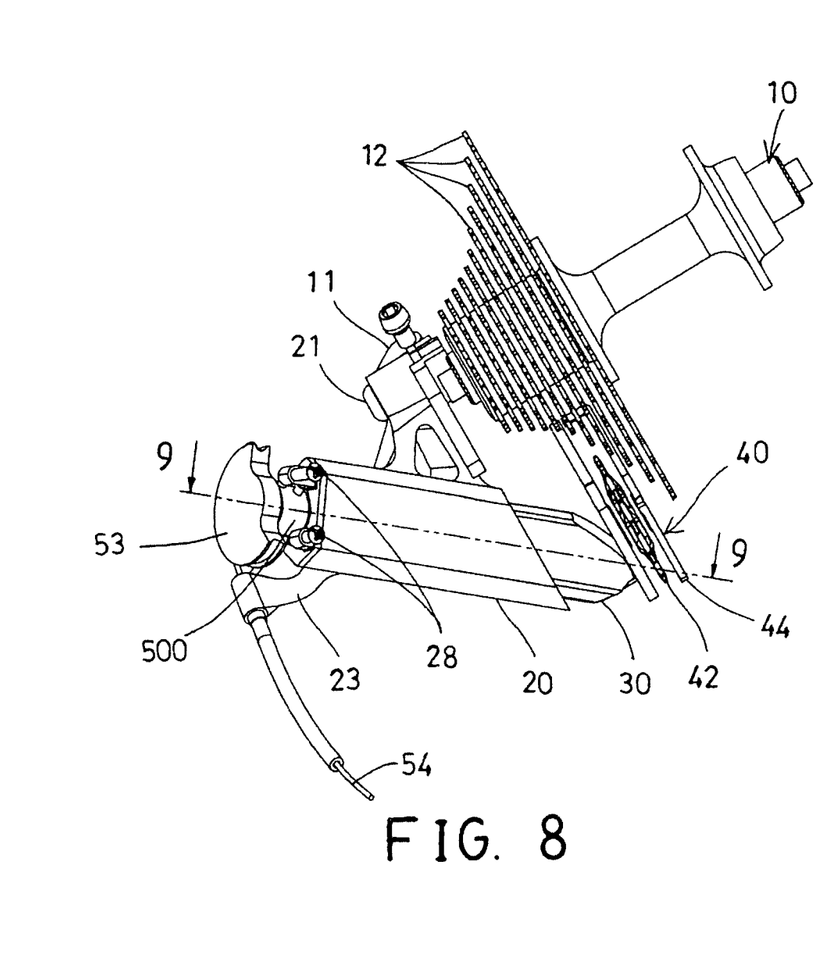
FIG. 8 is a partial top plan schematic view of the multiple sprocket assembly as shown in FIGS. 6 and 7.
Figure 9:
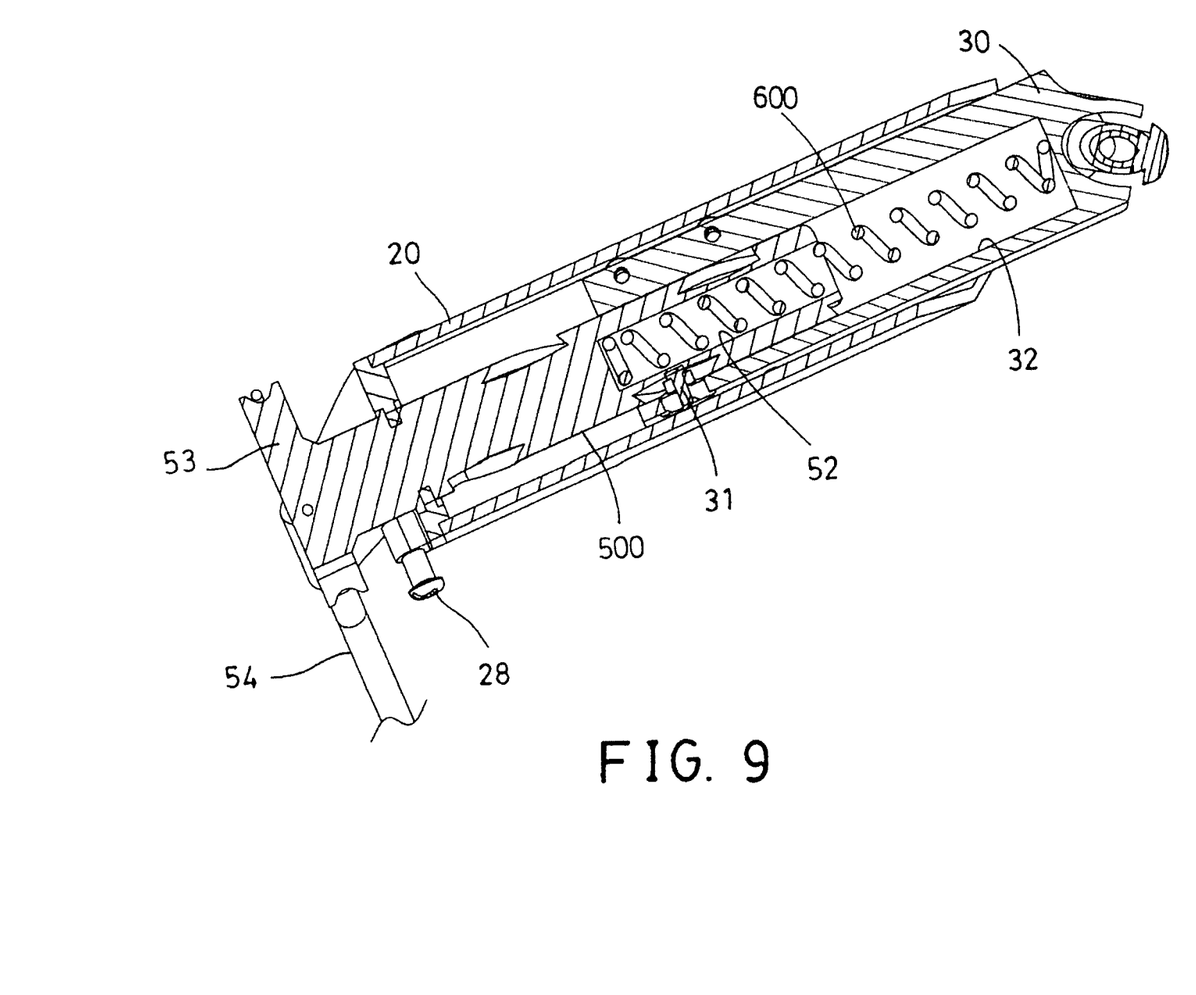
FIG. 9 is a partial cross sectional view of the multiple sprocket assembly taken along lines 9-9 of FIG. 8.

The carrier 40 includes one or more (such as two) jockey wheels 42, 43 pivotally or rotatably attached or mounted or secured between two parallel frame plates 44 of the carrier 40 with latches or fasteners 45 for engaging with the chain 99 and for suitably carrying or moving the chain 99 over or onto the teeth 13 of the sprockets 12. For example, as shown in FIGS. 4 and 5, the carrier 40 may be moved relative to the sprockets 12 by the sliding movement of the sliding member 30 relative to the support 20 for suitably carrying or moving the chain 99 over or onto the teeth 13 of the sprockets 12. It is preferable that the sliding member 30 and the support 20 are arranged parallel to an image plane 14 that is formed by the addendum of the teeth 13 of the sprockets 12, best shown in FIGS. 4 and 5, and the sliding member 30 and the carrier 40 are moved in a direction parallel to the image plane 14 that is formed by the addendum of the teeth 13 of the sprockets 12.

A moving or actuating device 5 includes a rotary shaft 50 engaged through the bore 26 of the cover 25 or of the support 20 and engaged into the compartment 32 of the sliding member 30, and includes a helical groove 51 formed in the outer peripheral portion of the rotary shaft 50 for engaging with the bearing members 31 and for actuating or guiding the shaft 50 to rotate relative to the sliding member 30 and for moving the sliding member 30 into or out of the support 20 when the shaft 50 is rotated relative to the support 20. The shaft 50 includes a hole or cavity 52 formed therein for receiving or engaging with a spring biasing member 60 which includes one end 61 attached or mounted or secured to the shaft 50 with one or more latches or fasteners 62 (FIGS. 1, 3) and the other end 63 attached or mounted or secured to the sliding member 30 with one or more fasteners or latch pins 34 (FIG. 1). For example, the spring biasing member 60 may be a compression spring biasing member or a draft or drag or expansion or extension spring biasing member for biasing or forcing or moving the shaft 50 relative to the sliding member 30.

For example, as shown in FIGS. 4 and 5, when the sliding member 30 and the carrier 40 are moved out of the support 20 or moved away from the shaft 50, the spring biasing member 60 may be expanded or extended and may have a spring biasing force to pull or to move the sliding member 30 into the support 20. The shaft 50 further includes an enlarged head or pulley 53 formed or provided on one end thereof for engaging with a cable 54 which is attached or mounted or secured to one of the extensions 23 of the support 20 and which is coupled to a typical shift lever (not shown) and which may rotate the shaft 50 relative to the sliding member 30 in order to move the sliding member 30 into or out of the support 20. The threaded or screw members or fasteners 28 may be threaded or rotated relative to the ears 27 of the cover 25 or of the support 20 for engaging with the shaft 50 and for guiding or limiting or adjusting the rotational movement of the shaft 50 relative to the support 20.

In operation, as shown in FIGS. 4 and 5, the carrier 40 may be moved relative to the sprockets 12, particularly moved in the direction parallel to the image plane 14 that is formed by the addendum of the teeth 13 of the sprockets 12, by the sliding movement of the sliding member 30 relative to the support 20, and with the cable 54 or the shift lever or with the moving or actuating device 5, in order to suitably carry or smoothly move the chain 99 over or onto the teeth 13 of the sprockets 12, the spring biasing member 60 may pull or move the sliding member 30 into the support 20 when the cable 54 or the shift lever is released. It is to be noted that the typical multiple sprocket assemblies failed to disclose or teach a carrier 40 that is movable relative to the sprockets 12 for suitably carrying or moving the chain 99 over or onto the teeth 13 of the sprockets 12.

Figure 10:
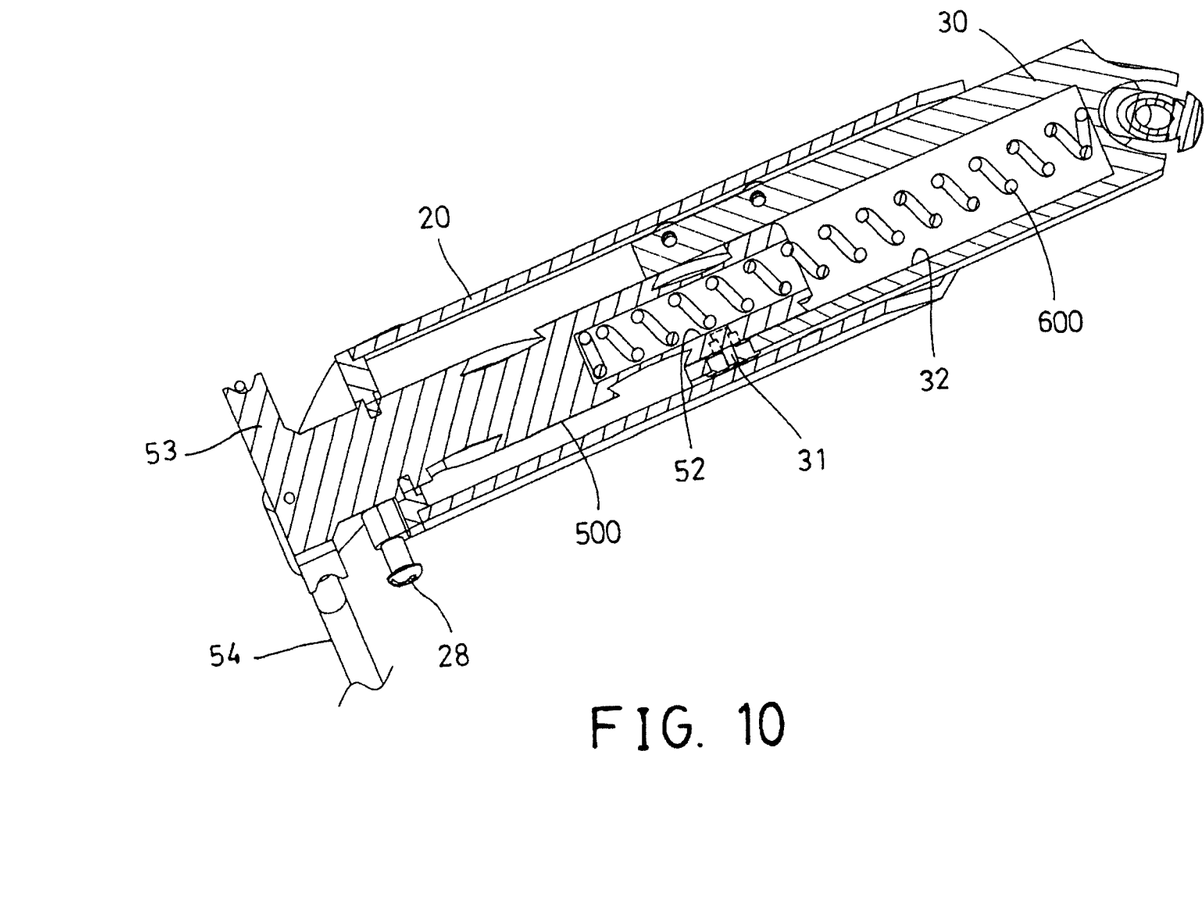
FIG. 10 is another partial cross sectional view similar to FIG. 9, illustrating the operation of the multiple sprocket assembly.
Figure 11:
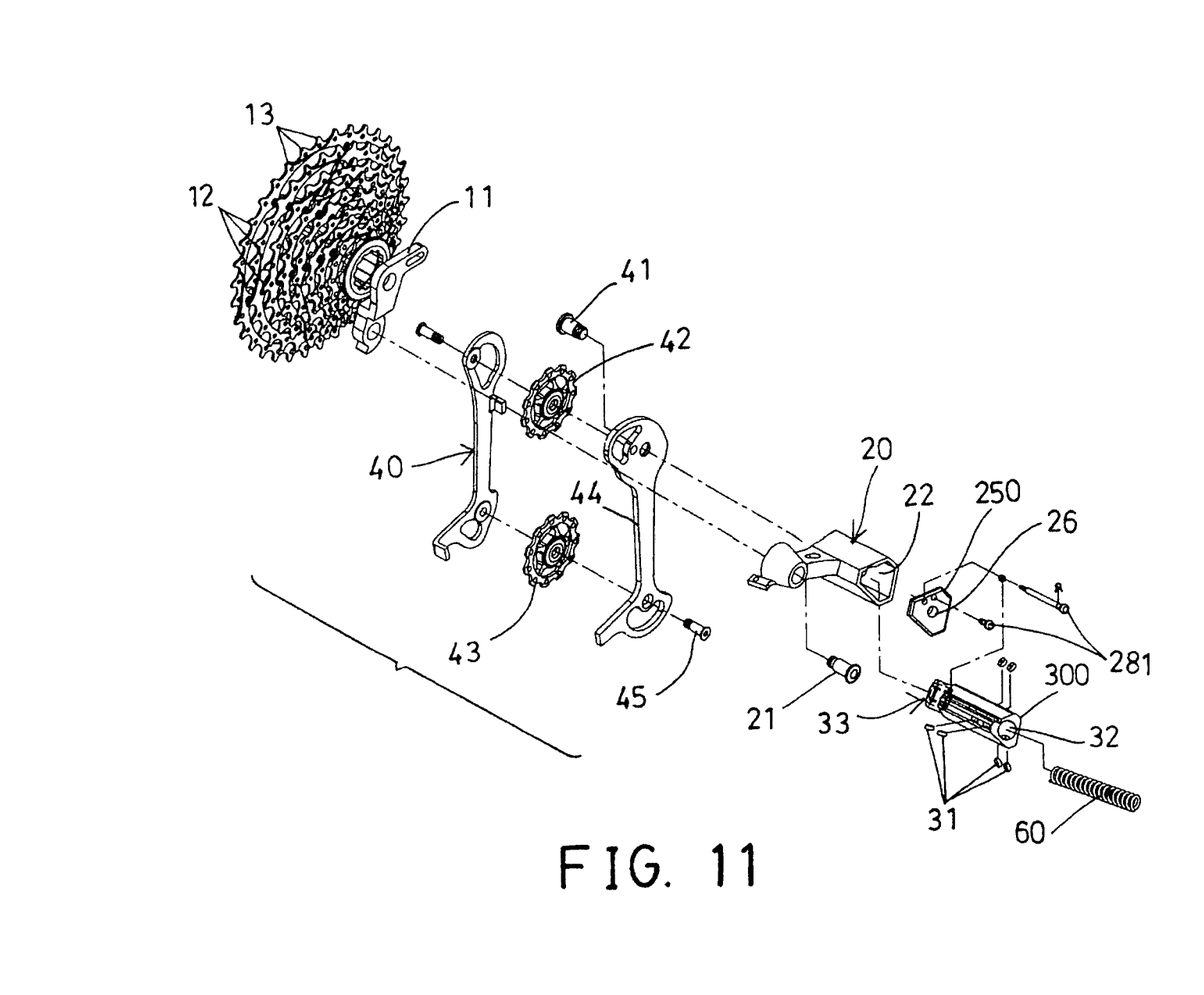
FIG. 11 is a further partial exploded view similar to FIGS. 1 and 6, illustrating the further arrangement of the multiple sprocket assembly.
Figure 12:
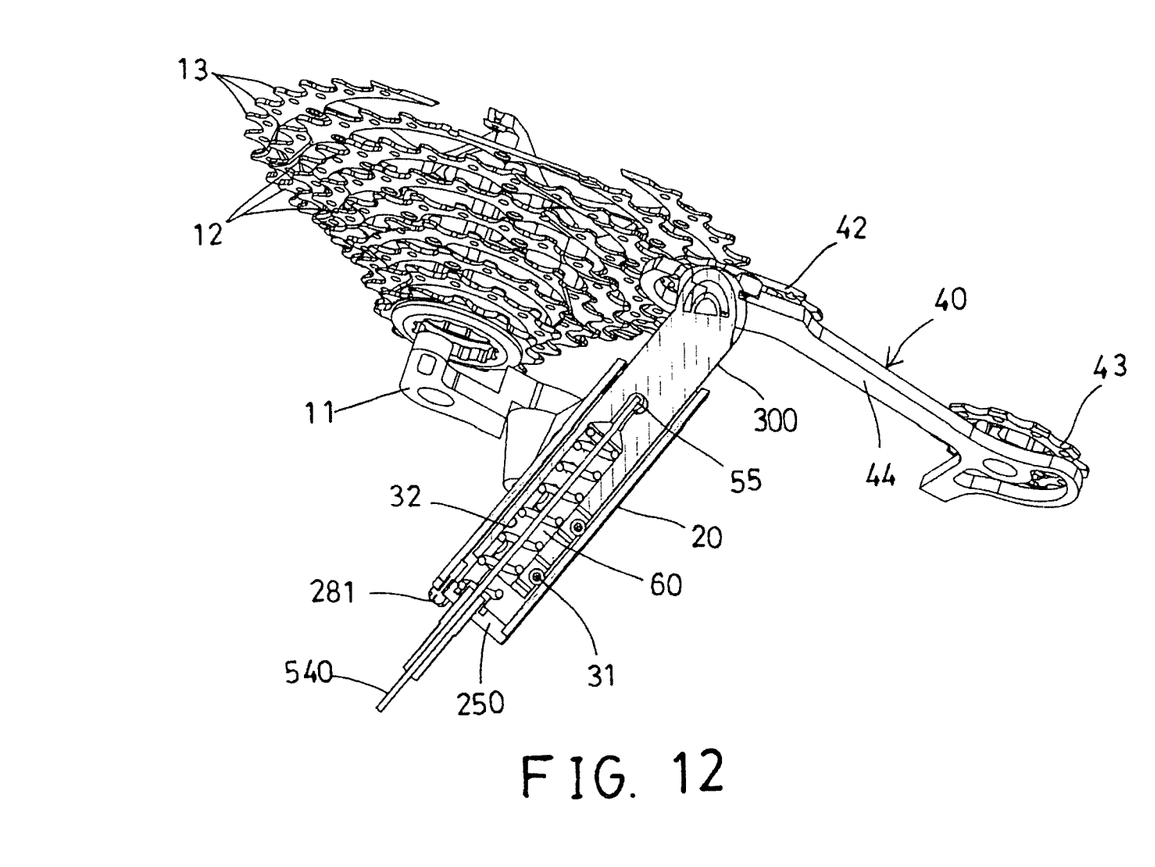
FIG. 12 is a partial perspective view of the multiple sprocket assembly as shown in FIG. 11.
Figure 13:
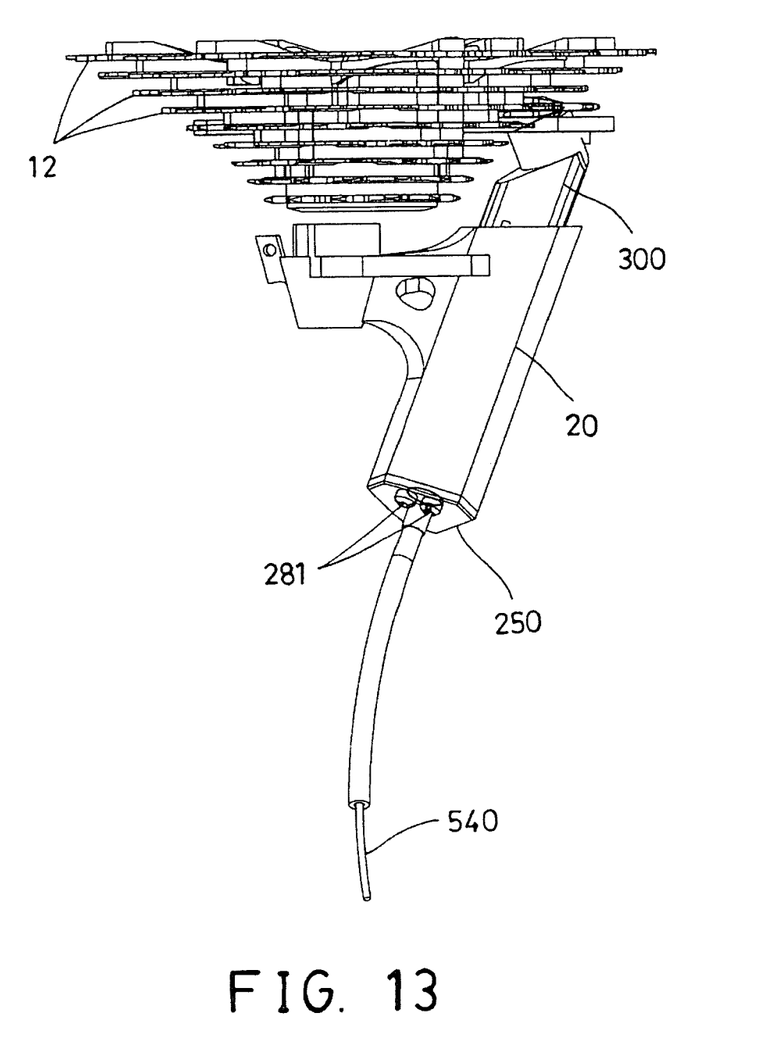
FIG. 13 is a partial top plan schematic view of the multiple sprocket assembly as shown in FIGS. 11 and 12.

Alternatively, as shown in FIGS. 6-10, the spring biasing member 600 may be a compression spring biasing member and may be compressed by the sliding member 30 is moved into the support 20. In operation, as shown in FIG. 10, the sliding member 30 is normally moved out of the support 20 by the spring biasing member 600 and may be moved into the support 20 and to compress the spring biasing member 600 (FIG. 9) by the shaft 500 when the shaft 500 is rotated relative to the support 20 by or with the cable 54 or the shift lever of the moving or actuating device 5, and the spring biasing member 600 may move the sliding member 30 out of the support 20 when the spring biasing member 600 is released.

Further alternatively, as shown in FIGS. 11-15, the cable 540 may be engaged through the bore 26 of the cover 250 or of the support 20 and engaged into the compartment 32 of the sliding member 300, and includes one end 55 (FIG. 12) attached or mounted or secured to the sliding member 300 with one or more latches or fasteners (not shown) or the like, and the cable 540 may act as the moving or actuating device 5 for moving the sliding member 30 relative to the support 20, the threaded or screw members or fasteners 281 may be threaded or rotated relative to the cover 250 of the support 20 for engaging with the sliding member 300 and for adjusting or limiting the sliding movement of the sliding member 300 relative to the support 20.

Accordingly, the multiple sprocket assembly in accordance with the present invention includes an improved carrying or moving device for smoothly carrying or moving the chain over or onto the sprockets of the multiple sprocket assembly and for preventing the chain from being scraped or scrubbed with the sprockets.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A multiple sprocket assembly comprising:
a plurality of sprockets attached to a hub of a bicycle frame, said sprockets each including a plurality of teeth, and said sprockets including an image plane formed by addendum of said teeth of said sprockets, and
a rear chain transfer device including a carrier slidably attached to the bicycle frame and movable relative to the image plane formed by addendum of said teeth of said sprockets for engaging with a chain and for carrying and moving the chain onto said teeth of said sprockets, and
said rear chain transfer device including a support attached to the bicycle frame, and a sliding member slidably attached to said support, said sliding member including at least one bearing member engaged with said support and said sliding member for allowing said sliding member to be smoothly moved relative to said support, said carrier being attached to said sliding member, said sliding member including a compartment formed therein, an actuating device including a shaft rotatably attached to said support and engaged into said compartment of said sliding member, and said shaft including a helical groove formed in an outer peripheral portion of said shaft for engaging with said at least one bearing member and for actuating said shaft to rotate relative to said sliding member and for moving said sliding member into and out of said support when said shaft is rotated relative to said support, and said shaft including a pulley for engaging with a cable.

2. The multiple sprocket assembly as claimed in claim 1, wherein said support includes a chamber formed therein for slidably receiving and engaging with said sliding member.

3. The multiple sprocket assembly as claimed in claim 1, wherein said support includes a cover, said shaft is rotatably attached to said cover of said support.

4. The multiple sprocket assembly as claimed in claim 3, wherein said support includes at least one fastener attached to said cover for engaging with said shaft and for limiting said shaft to rotate relative to said support.

5. The multiple sprocket assembly as claimed in claim 1, wherein said carrier includes at least one frame plate, and a pair of jockey wheels attached to said at least one frame plate.

6. A multiple sprocket assembly comprising:
a plurality of sprockets attached to a hub of a bicycle frame, said sprockets each including a plurality of teeth, and said sprockets including an image plane formed by addendum of said teeth of said sprockets, and
a rear chain transfer device including a carrier slidably attached to the bicycle frame and movable relative to the image plane formed by addendum of said teeth of said sprockets for engaging with a chain and for carrying and moving the chain onto said teeth of said sprockets, and
said rear chain transfer device including a support attached to the bicycle frame, and a sliding member slidably attached to said support, said sliding member including at least one bearing member engaged with said support and said sliding member for allowing said sliding member to be smoothly moved relative to said support, said carrier being attached to said sliding member, said sliding member including a compartment formed therein, an actuating device including a shaft rotatably attached to said support and engaged into said compartment of said sliding member, and said shaft including a helical groove formed in an outer peripheral portion of said shaft for engaging with said at least one bearing member and for actuating said shaft to rotate relative to said sliding member and for moving said sliding member into and out of said support when said shaft is rotated relative to said support, and said shaft including a cavity formed therein for receiving a spring biasing member which is secured between said shaft and said sliding member.

7. The multiple sprocket assembly as claimed in claim 6, wherein said spring biasing member includes a first end secured to said shaft and a second end secured to said sliding member.

* * * * *